(12) United States Patent
Joesten et al.

(10) Patent No.: US 11,408,541 B2
(45) Date of Patent: Aug. 9, 2022

(54) COUPLING DEVICE FOR CONNECTING ELONGATED HOLLOW BODIES IN AN ASSEMBLY SYSTEM

(71) Applicant: LEONI KABEL GMBH, Roth (DE)

(72) Inventors: Bernd Joesten, Laatzen (DE); Torsten Denk, Steinbach-Hallenberg (DE); Sascha Danz, Floh-Seligenthal (DE); Kay Andreas, Eisenach (DE); Manuel Reich, Schmalkalden (DE)

(73) Assignee: BIZLINK INDUSTRY GERMANY GMBH, Roth (DE)

( * ) Notice: Subject to any disclaimer, the term of this patent is extended or adjusted under 35 U.S.C. 154(b) by 422 days.

(21) Appl. No.: 16/307,000

(22) PCT Filed: May 30, 2017

(86) PCT No.: PCT/EP2017/063037
§ 371 (c)(1),
(2) Date: Dec. 4, 2018

(87) PCT Pub. No.: WO2017/215911
PCT Pub. Date: Dec. 21, 2017

(65) Prior Publication Data
US 2019/0219202 A1 Jul. 18, 2019

(30) Foreign Application Priority Data
Jun. 16, 2016 (DE) .......................... 102016210799.2

(51) Int. Cl.
*F16L 21/00* (2006.01)
*B21J 15/32* (2006.01)
*F16L 11/12* (2006.01)

(52) U.S. Cl.
CPC ............. *F16L 21/007* (2013.01); *B21J 15/32* (2013.01); *F16L 11/121* (2013.01)

(58) Field of Classification Search
CPC ......... F16L 21/007; F16L 11/121; B21J 15/32
(Continued)

(56) References Cited

U.S. PATENT DOCUMENTS 2,532,928 A * 12/1950 Frank ....................... B21J 15/32
227/62
3,521,912 A * 7/1970 Maurer ................... F16L 19/10
29/520
(Continued)

FOREIGN PATENT DOCUMENTS

DE 29507041 9/1995
DE 29719744 4/1998
(Continued)

*Primary Examiner* — James M Hewitt, II
(74) *Attorney, Agent, or Firm* — Tarolli, Sundheim, Covell & Tummino LLP (57) ABSTRACT

Coupling device (12) for connecting elongated hollow bodies (26, 28) in an assembly system (10), comprising: a first receiving opening (32) for receiving a first elongated hollow body (26) and a second receiving opening (34) for receiving a second elongated hollow body (28), wherein the receiving openings (32, 34) are arranged relative to one another in such a way that the first and second elongated hollow bodies (26, 28) can be coupled to one another after introduction into the respective receiving openings (32, 34).

11 Claims, 5 Drawing Sheets

(58) Field of Classification Search
USPC .......................................... 285/342, 343, 369
See application file for complete search history.

(56) References Cited

U.S. PATENT DOCUMENTS

| | | | | |
|---|---|---|---|---|
| 3,596,932 | A * | 8/1971 | Kinsey | F16L 21/002 285/81 |
| 3,986,731 | A * | 10/1976 | DeHoff | F16L 19/08 285/81 |
| 5,036,576 | A | 8/1991 | Gast | |
| 5,299,351 | A | 4/1994 | Takahashi et al. | |
| 8,894,100 | B2 * | 11/2014 | Eaton | F16L 17/04 285/369 |
| 9,352,383 | B2 | 5/2016 | Craythorn et al. | |
| 10,059,534 | B2 | 8/2018 | Kuehn | |
| 2002/0092158 | A1 * | 7/2002 | Opper | B21J 15/32 29/798 |
| 2009/0078094 | A1 * | 3/2009 | Dubiel | B25B 23/04 81/431 |
| 2015/0052732 | A1 | 2/2015 | Craythorn et al. | |

FOREIGN PATENT DOCUMENTS

| | | | | |
|---|---|---|---|---|
| DE | 20114345 | 2/2003 | | |
| DE | 20051000127 | 3/2007 | | |
| DE | 102010064071 | 5/2012 | | |
| DE | 102016112732 A1 * | 1/2018 | ............ | B65G 51/24 |
| EP | 0185475 | 6/1986 | | |
| EP | 0666446 | 8/1995 | | |
| EP | 0961673 | 12/1999 | | |
| EP | 1152847 | 11/2001 | | |
| EP | 2031725 | 3/2009 | | |
| JP | 2002079346 | 3/2002 | | |
| JP | 2003203605 | 7/2003 | | |
| JP | 2009080393 | 4/2009 | | |
| KR | 1304451 | 9/2013 | | |
| WO | 0007751 | 2/2000 | | |
| WO | 2007031701 | 3/2007 | | |
| WO | 2007132195 | 11/2007 | | |
| WO | WO-2010145885 A1 * | 12/2010 | ............ | B23P 19/005 |
| WO | 2012-098128 | 7/2012 | | |
| WO | 2014148992 | 9/2014 | | |

* cited by examiner

Fig. 8

COUPLING DEVICE FOR CONNECTING ELONGATED HOLLOW BODIES IN AN ASSEMBLY SYSTEM

RELATED APPLICATION

This application filed under 35 U.S.C. § 371 is a national phase application of International Application Serial Number PCT/EP2017/063037 filed May 30, 2017, which claims priority to German Patent Application No. 10 2016 210 799.2 filed on Jun. 16, 2016, the disclosure of which is entirely incorporated herein by reference.

BACKGROUND ART

The following disclosure relates to a coupling device for connecting elongated hollow bodies in an assembly system, and an assembly system which comprises such a coupling device.

In assembly systems, elongated hollow bodies, for example in the form of hoses, pipes or ducts, are used for a variety of purposes. Often they are used to transport fluids, components or, when suitable lines are included, also power and/or data between various areas and units of the assembly system. The hollow bodies are subjected here to constant wear and must therefore be replaced regularly as part of servicing works. Since the hollow bodies are mostly routed over longer distances to or through the assembly system and can also take a complex route here and be attached at several points, it can be extremely laborious to undertake such an exchange. Furthermore, in the event of wear in just one comparatively small area, the entire hollow body often has to be exchanged, which can be accordingly expensive.

A need therefore exists to improve the arrangement and maintenance of elongated hollow bodies in an assembly system.

DISCLOSURE OF THE INVENTION

To this end a coupling device for connecting elongated hollow bodies in an assembly system is provided, comprising: a first receiving opening to receive a first elongated hollow body and a second receiving opening to receive a second elongated hollow body, wherein the receiving openings are arranged relative to one another in such a way that the first and second elongated hollow bodies can be coupled to one another after introduction into the respective receiving openings.

The coupling device can generally be positioned at any position along the route section of the hollow bodies in the assembly system, for example centrally between a section start and end. It is made possible by this that two elongated hollow bodies of reduced length can be used instead of single hollow body extending over the entire route section. In other words, the first elongated hollow body can extend from the section start (or from a first connection) up to the coupling device and the second elongated hollow body can extend between the coupling device and the section end (or up to a second connection). The two elongated hollow bodies can be connected by the coupling device so that a continuous route and if applicable a continuous conveying ability of fluids or components through the hollow bodies is achievable from the first to the second connection.

If excessive wear occurs, only the elongated hollow body that is actually affected by this has to be exchanged. The less strongly affected hollow bodies can remain in the assembly system for the time being, on the other hand. This reduces costs and increases service-friendliness.

An elongated hollow body can be understood to mean any hollow body with an axial extension that exceeds the cross-sectional dimensions. Hoses, pipes and elongated ducts or shafts can be cited as examples. The hollow body is formed flexibly, for example, and can generally be manufactured from a plastic material. The hollow body can further be formed in one piece or composed of several individual components and/or layers. In particular, the hollow body can have a sheathing. As explained below, the elongated hollow bodies can be rivet feed-hoses or so-called rivet feed-hose cores and the assembly system can comprise an industrial robot as well as a rivet storage unit, which can be connected by means of the rivet feed-hoses and via the coupling device.

The receiving openings can have any cross-sectional profile and generally be formed in areas of the coupling device lying opposite one another. The receiving openings can further define a connection axis or be arranged along this, wherein the hollow bodies can be introduced into the coupling device along the connection axis to be coupled to one another. Coupling can be understood as a (direct or indirect) connection of the two hollow bodies, which facilitates the continuous route explained above or the continuous conveying ability by means of and through the two hollow bodies. In particular, a contact can be created between the hollow bodies in this case. According to one variant, the hollow bodies can be introduced with open ends into the respective receiving openings, wherein the open ends can then be coupled to one another and in particular brought into contact. In other words, the hollow bodies can be coupled to one another by pushing onto one another or at least opposing arrangement of open cross-sectional areas and/or end face areas.

A further development provides that at least one of the receiving openings comprises an exchangeable adapter piece, which is formed to receive an elongated hollow body with predetermined cross-sectional dimensions.

The adapter piece can generally be formed as a separate component and arranged in the coupling device if necessary, in particular depending on the hollow body used. To this end it can be inserted into the receiving openings, screwed to these and connected in a positive-locking manner or otherwise detachably, so that the elongated hollow body can be pushed into the receiving opening and the adapter piece arranged therein. To receive the hollow body, the adapter piece can further comprise an opening, hole or internal profile.

The adapter piece can generally be formed in one piece. The adapter piece can also be formed in several parts and in particular in two parts, wherein the individual constituents of the adapter piece can be selected according to the current dimensions of the hollow body and connected to one another. The adapter piece can further be formed in such a way and in particular (internally) profiled in such way that it encloses the associated elongated hollow body substantially in a positive-locking manner, at least in sections. The adapter piece can further be manufactured from a plastic material, in particular a slightly flexible material, wherein, however, substantially fixed dimensions of the adapter piece are preferred and in particular the internal profile dimensions (i.e. no manual adjustability via thread arrangements or similar).

For example, the coupling device comprises an adapter piece per receiving opening, wherein the adapter pieces can be formed, for example, to receive identically dimensioned and/or profiled hollow bodies.

The adapter piece generally makes it possible for the coupling device to be connectable flexibly to different types of elongated hollow bodies without other separate measures having to be taken on the coupling device itself. On the contrary, it can be sufficient just to select a suitable adapter piece and arrange it in the receiving opening. The coupling device can thus remain substantially permanently and unchanged in the assembly system, although the cross-sectional dimensions of the elongated hollow bodies may change depending on the current assembly task (for example because rivets of different sizes have to be transported by means of the hollow bodies). This increases the flexibility of the assembly system and reduces the conversion outlay, while the advantages generally achievable with the coupling device can be retained (see above discussion on reduced maintenance costs etc.).

A further development provides that the coupling device further comprises a basic body, in which the first and second receiving openings are formed, wherein the receiving openings are connected to one another via at least one connecting channel in the basic body. The basic body can be formed substantially in one piece or composed of several individual components. For example, the basic body comprises a material that is resistant to compressed air and possibly also not deformable. In one variant the basic body is formed as a metal block and in particular as an aluminium block. However, the use of a plastic basic body or a combination of metal and plastic materials is also conceivable.

The connecting channel can further be formed as a hole or recess and extend between the two receiving openings in a straight line through the basic body, for example. Overall this enables the elongated hollow bodies to be arranged reliably and correctly positioned relative to one another and to be connected to one another.

In this connection it can further be provided that the connecting channel is formed, at least in sections, with a closed cross-sectional profile, for example rectangular or circular. This facilitates a corresponding secure arrangement and holding of the hollow bodies in the coupling device and can, as explained below, also suppress a misorientation of the hollow bodies to one another. It can further be provided that the connecting channel is formed along its entire length, predominantly or at least over a (cumulative) section proportion of 80% with a closed cross-sectional profile. The closed cross-sectional profile can thus only be interrupted locally, for example by cross bores for sensor units or compressed air connections as explained below.

According to a specific embodiment, the coupling device can further be formed to connect the hollow bodies to one another substantially with fluidic decoupling from the environment. In other words, it can be provided that following introduction into the receiving openings and if applicable into an adapter piece there, the hollow bodies can be enclosed by the coupling device in such a way that they are substantially sealed off from the environment. This is especially relevant for variants in which the hollow bodies are acted upon by a pressure medium (e.g. compressed air) and the connection by means of the coupling device should not lead to any substantial pressure losses. By "substantially fluidic decoupling" a decoupling is to be understood in particular that permits a pressure loss, in the event of pressure acting on the hollow bodies, of less than 20% and for example less than 10% or less than 5% across the coupling device.

A further development provides that the coupling device is formed so that the adapter piece can only be arranged therein with predetermined orientations. It can be provided in particular here that an area of the coupling device provided for receiving the adapter piece, such as a receiving opening, for example, a possible clamping device explained below and/or the connecting channel, is formed so that the adapter piece can be arranged therein only with predetermined orientations. The corresponding areas of the coupling device can be specially profiled and/or dimensioned for this purpose and the adapter piece can comprise an external profile corresponding to this. The corresponding areas and in particular the receiving openings can be generally profiled in any way in this case and have, for example, a rectangular, oval or polygonal cross-sectional profile. They can define at least one orientation of the adapter piece relative to this cross-sectional profile with which this cannot be introduced into the receiving opening. For example, the coupling device is formed so that the adapter piece can be introduced into it only with a maximum of two different orientations or only with a single orientation. The term "orientation" can refer in this case to a rotational position of the adapter piece about a connection axis V of the coupling device, or about an orientation relative to a suitably counterprofiled receiving area of the coupling device for the adapter piece.

In this connection it is advantageous, furthermore, if both receiving openings comprise an adapter piece and are formed according to one of the above variants. The introduction and thus also connection of both elongated hollow bodies with a preferred orientation can be ensured by this. In other words, it can be ensured via the design of the receiving areas of the coupling device for the adapter pieces that the adapter pieces and thus also the hollow bodies receivable therein can be introduced into the coupling device and then coupled to one another only with preferred orientations relative to one another.

The elongated hollow bodies can further comprise a predetermined cross-sectional profile and the adapter piece can comprise a correspondingly profiled receiving area for receiving the hollow body. An especially reliable receiving of the hollow bodies in the adapter piece can be guaranteed by this. In particular, a positive-locking and if applicable even fluidically sealing receiving in the adapter piece can be provided in this case. For example, the hollow body can be formed with a T-profile and the adapter piece can comprise a correspondingly shaped hole or a corresponding internal profile, which acts as a receiving area. If the adapter piece is formed in two parts, in particular so that each individual part defines at least a part of the internal profile of the adapter piece, the individual parts of the adapter piece can generally be assembled flexibly and matching the current cross-sectional profile of the hollow body to be received.

The coupling device can additionally comprise at least one clamping device, which is formed to clamp at least one of the hollow bodies and/or the adapter piece in the coupling device. The clamping forces generated in this case can generally facilitate a centring in the coupling device and/or a desired relative positioning of the hollow bodies to one another. They can also fix the hollow bodies at least temporarily, for example in the event of a manual exchange and "reconnection" of the hollow bodies. In addition or alternatively the clamping device can fix the hollow bodies and/or the adapter piece also permanently in the coupling device, in particular during ongoing operation of the assembly system and under the possible impact of a pressure medium on the hollow bodies.

The clamping device can generally be formed to build up the clamping forces only selectively (for example, following manual actuation) and otherwise to assume a clamping-force-free state. The clamping forces that can be provided can also be limited so that they continue to permit a manual introduction and movement of the hollow bodies and/or of the adapter piece into the coupling device. Finally, the clamping forces can act generally radially and be directed for example radially inwards, for example related to a cross section plane of the receiving openings, to a connection axis of the coupling device and/or to the longitudinal axes of the hollow bodies.

The clamping device can further be arranged in the region of one of the receiving openings, thus in or on one of the receiving openings, for example.

The clamping device can also comprise a nut-thread arrangement, in which a clamping element is received, wherein the clamping element is formed to generate radial clamping forces according to a screwing movement of the nut. In this variant the thread can be formed on a basic body, which can generally be arranged fixed and/or arranged in a receiving opening or coupled to this. The nut, on the other hand, can be arranged movably on the thread, in particular so that it is easily accessible from outside the coupling device and manually adjustable. If the hollow body and/or the adapter piece are inserted into the receiving opening, the nut can be screwed further onto the thread, for example ("screwing down" of the nut-thread arrangement), whereby clamping forces directed radially inwards, for example, and thus in the direction of the hollow body and/or of the adapter piece, can be generated.

The clamping element can comprise a flexibly deformable material or be produced from this and is formed annularly, for example. The clamping element can further be formed to constrict or expand a receiving area of the clamping device for the hollow body and/or the adapter piece according to the screwing movement. This can be achieved in that the clamping device experiences increasing or decreasing compression in this screwing movement, and is thus pressed radially inwards to a different extent. According to one variant, the clamping element comprises at least one deformation section, which is pushed increasingly out of an initial circumferential plane when the nut is screwed onto the thread and kinks radially inwards, so to speak.

In detail the thread can be formed on an external circumferential surface of a cylindrical or annular basic body of the nut-thread arrangement. In the inner region of this basic body, for example close to the internal circumferential surface, a stop surface can further be provided, on which the clamping element is supported. The nut can also be formed in the same way with a corresponding stop surface, so that the clamping element can be arranged between the two stop surfaces. If the nut is now screwed onto the thread, the distance between the stop surfaces is reduced and the clamping element is compressed to an increasing extent. In this case it can only escape inwards or radially inwards, so that it constricts a corresponding receiving area for the hollow body and/or the adapter piece and exerts clamping forces on the elements arranged therein. So-called "IP screw connections" or "system screw connections", which are on the whole particularly effective, can be provided by this.

It can also be provided that the clamping device is arranged in the connecting channel of the basic body. In this case the clamping device further comprises a pressure element, for example, which can be brought into contact with the hollow body and/or the adapter piece with the production of clamping forces. The pressure element can be spring-preloaded here (e.g. in a direction directed radially inwards), wherein the preloading force can generally be selected so that the hollow body and/or the adapter piece can continue to be moved manually past the pressure element. The pressure element can further be formed as a ball or roller and/or supported rotatably, in order to make pushing past easier. Furthermore, at least two opposing pressure elements of the above kind can be provided, in order to centre the hollow body and/or the adapter piece in the connecting channel. For example, at least four pressure elements are provided, which can each be brought into contact with a different side of the hollow body and/or of the adapter piece. It can further be provided that at least one corresponding clamping device is provided on both sides of the (axial) centre of the connecting channel along its route between the receiving openings.

It is understood that generally several clamping devices can be provided in a coupling device, wherein even clamping devices according to different variants can be combined. For example, it can be provided that each receiving opening is provided with a clamping device in the form of a nut-thread arrangement, for example, and the connecting channel likewise comprises one of the above clamping devices, for example on both sides of its axial centre.

The coupling device can further comprise at least one sensor unit, which detects the passage of an element and/or fluid volume to be conveyed through the coupling device and for example the passage of a metal component transported through the hollow body. The latter can have the form of a connecting element for assembly, such as a rivet, for example. The sensor unit, which can also be described as an indicator, can operate capacitively or inductively for this purpose, wherein the elements (hollow body/rivet core, adapter piece) arranged between the sensor unit and the components to be conveyed comprise plastic materials, for example, or are produced from these. If such a component is transported through the hollow bodies inside the coupling device (e.g. by means of compressed air), the sensor unit can detect this and generate a corresponding signal or a signal pulse. For example, the detection area of the sensor unit for this is arranged in the region of a coupling area of the adapter pieces (e.g. in the region of the axial centre of the connecting channel). The sensor unit can also be associated with one of the adapter pieces and/or detect a region, for example, which lies looking in the conveying direction between the coupling area of the adapter pieces and an (outlet) receiving opening of the coupling device, so that a successful passing of the coupling area can be detected.

The signal generated by the sensor unit can accordingly indicate a successful conveying of a component through the coupling device and thus at least indirectly confirm a successful coupling of the hollow bodies. It can further be provided that the sensor unit or a control unit of the assembly system connected to this generates a warning signal if an expected passage of the component is not registered or if a "constant signal" is present, which indicates the sticking of a component in the detection area of the sensor unit.

The coupling device can further comprise a connection area for the supply of a pressure medium, for example in the form of a compressed air connection, wherein the connection area can be connected to at least one of the hollow bodies in a fluid-conducting manner. The fluid-conducting connection can take place here via holes through the adapter piece and/or the hollow bodies. The connection area can further be provided as a hole, which extends up to the connecting channel and runs transversely to a basic body longitudinal axis or connection axis, for example. The connection area can thus be formed generally in the shape of a channel and optionally comprise a thread for connecting a compressed air line. The connection area is located here, for example, in the region of an axial centre of the connecting channel or close to a coupling area of the adapter pieces and/or of the hollow bodies.

It can generally be provided that an assembly system comprising the coupling device is formed to deliver a compressed air supply via the connection area continuously or temporarily according to operating states of the assembly system and/or to sensor signals of the sensor unit. The time, the duration and/or the volume of the compressed air supplied can be selected in this case according to a detected component passage through the coupling device, a predetermined cycle time and/or a length of the elongated hollow bodies.

In this connection, a further development provides that the coupling device comprises an adapter intermediate piece, which can be arranged in the coupling device so that at least one of the hollow bodies can be connected in a fluid-conducting manner to the connection area via the adapter intermediate piece. The adapter intermediate piece can be arranged here adjacent to at least one adapter piece and in particular be in contact with this. For example, the adapter intermediate piece is arranged between two adapter pieces, which each receive one of the hollow bodies, and likewise positioned in the connecting channel of the hollow body, for example. The adapter intermediate piece can further comprise a cavity, which is connectable in a fluid-conducting manner to at least one of the hollow bodies, in order to guarantee the compressed air supply described above. In particular, it can be provided that the cavity is formed in the shape of a channel and/or as a through-hole and has an internal profile, for example, that corresponds substantially to that of the hollow bodies (in particular a T-shaped profile for transporting rivets). The adapter intermediate piece can further comprise an annular groove, which is connected in a fluid-conducting manner to the compressed air connection area and from which holes extend into the cavity, for example.

It should also be generally recorded that the term compressed air can here also include suitable gases or gas mixtures and not only compressed ambient air.

The disclosure further relates to an assembly, comprising a coupling device according to one of the previous claims and at least one other exchangeable adapter piece, wherein the adapter pieces are formed to receive hollow bodies with cross-sectional dimensions differing from one another.

In other words, it is provided here that the cross-sectional dimensions of the elongated hollow bodies, which can be received by the adapter pieces, differ from one another. This assembly simplifies the conversion of the coupling device explained above in the case of changing assembly tasks, as here only the adapter pieces have to be exchanged depending on the hollow bodies to be coupled.

The disclosure further relates to an assembly system, comprising at least one coupling device according to one of the previous claims and two elongated hollow bodies, which are connectable to the coupling device, wherein the elongated hollow bodies are formed as supply hoses for assembly elements to a tool unit. In this variant the hollow bodies are accordingly formed to conduct components from a storage unit, for example, to a tool unit. The storage and/or tool unit can be part of the assembly system or formed separately from this.

In this connection it can also be provided that the assembly elements comprise connection elements and in particular rivets. The hollow bodies can accordingly be rivet supply hoses, or so-called rivet cores. These can generally be formed elongated and with a suitable cross-sectional profile (in particular T-shaped), in order to transport the rivets to the tool unit while maintaining a preferred positional orientation.

Finally, the assembly system can also be formed to undertake the supply of assembly elements to the tool unit under the impact of compressed air on the supply hoses. In the case of rivet supply hoses, it can thus be provided that the rivets are moved by means of compressed air through and along the hoses to get to the tool unit. In this connection it is particularly advantageous if the coupling device facilitates a fluidically sealing connection to the rivet hoses to be coupled, as explained above.

The assembly system can further comprise an industrial robot with a plurality of moving robot limbs, wherein the coupling device is arranged on one of the robot limbs. As is known, the industrial robot can be formed as a 6-axis articulated robot, wherein the robot limbs are connected via the robot axes and are movable relative to one another. The arrangement of the coupling device directly on the industrial robot permits arrangement close to the tool unit as well as a comparatively large distance to any storage unit of the assembly elements. This means that the particularly wear-intensive and thus frequently to be exchanged areas of the hollow body can be formed close to the tool unit as comparatively short hollow body or hose sections, due to which the servicing and renewal costs can be kept suitably low (see also following explanation).

A further development provides that the robot limbs form a kinematic chain, at the end of which a connection area for the tool unit is arranged, and the coupling device is mounted on a robot limb, which is spaced by a maximum of four robot limbs from the connection area.

Alternatively the coupling device can be mounted on a robot limb that is spaced by a maximum of three, two or just one robot limb from the connection area or on the robot limb that is directly upstream of the connection area or formed with this. In other words, this variant provides for arrangement of the coupling device as close as possible to the tool unit.

The inventors have recognised that in this area of the industrial robot comparatively large movements can take place in a small space, due to which the hollow bodies are correspondingly strongly deformed and/or multiply deflected. This increases the wear, so that hollow body sections running there must be exchanged comparatively early. By arranging the coupling device in this area, it can thus be guaranteed that a longer first hollow body, which leads to a storage unit for the assembly elements, for example, can be used for a longer period.

A more strongly deformed, shorter second hollow body, which leads from the coupling device to the tool unit, can on the other hand be exchanged quickly and with little effort after shorter intervals. As a result this reduces the costs, as on reaching a wear limit only the shorter, second hollow body usually has to be exchanged, while the less stressed first hollow body can be retained.

BRIEF DESCRIPTION OF THE DRAWINGS

The present disclosure is to be explained with further reference to figures. These figures show schematically.

DETAILED DESCRIPTION

In the following, without being restricted to these, specific details are described to deliver a complete understanding of the present disclosure. However, it is clear to a person skilled in the art that the present disclosure can be used in other exemplary embodiments, which may deviate from the details described below. For example, specific configurations and arrangements of a coupling device and an assembly system are described below that should not be regarded as restrictive. Furthermore, various application areas of the coupling device are conceivable. Purely by way of example only the application for connecting fluid-carrying hoses and cable shafts or ducts are cited here.

A specific exemplary application area of the assembly system described in greater detail below and its coupling device lies in the field of automatic assembly by means of an industrial robot, in particular for carrying out automatic riveting processes. In these cases it is known to supply rivets from a storage unit to a tool unit arranged on the industrial robot via rivet supply hoses acted on by compressed air, wherein the rivet supply hoses are coupled by the coupling device.

Figure 1:
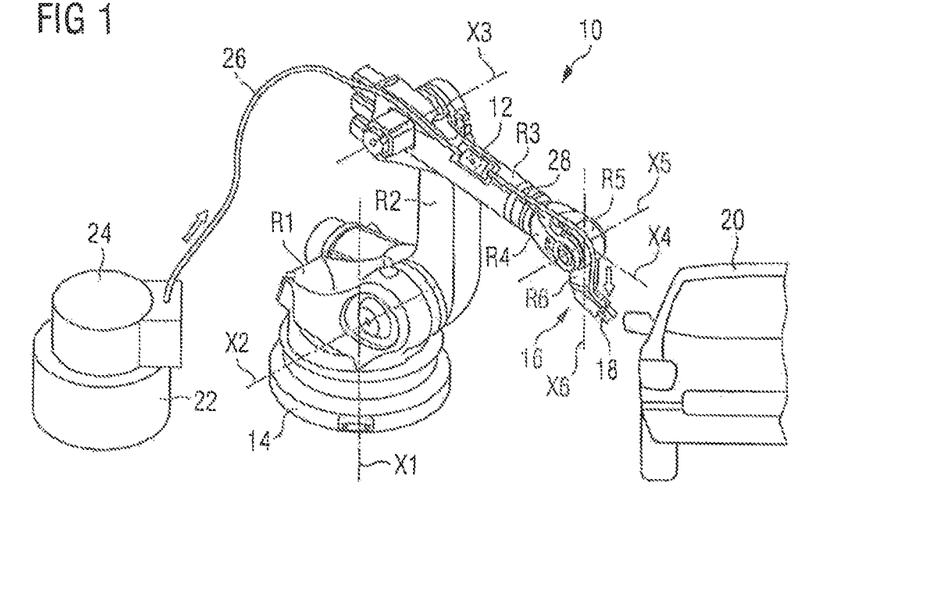
FIG. 1 a representation of an assembly system comprising a coupling device according to an exemplary embodiment.

FIG. 1 shows an assembly system 10 comprising a coupling device 12 according to a first exemplary embodiment. The assembly system 10 comprises an industrial robot 14, which is formed as a conventional 6-axis articulated robot and comprises a plurality of robot limbs R1 to R6. These are connected to one another by the individual axes X1 to X6 and are movable relative to one another. Here the robot limbs R1-R6 form an open kinematic chain, at the end of which a connection area 16 is formed, which is coupled to a riveting tool unit 18. This can insert rivets supplied to it into components in a known manner and rivet them (here shown schematically on the example of a vehicle 20).

In FIG. 1 a storage unit 22 is also recognised, in which the loose rivets are taken up initially unsorted. The rivets can be separated and positionally oriented in a preferred manner by a separating device 24 of the storage unit 22 (for example, by a vibrating spiral conveyor with suitable sorting chicanes). In the case of the generally T-shaped rivets, an upright T-orientation is provided in the case shown at the outlet of the separating device 24, wherein the rivets pass with this orientation into an elongated hollow body in the form of a rivet supply hose 26. As explained below, the rivet supply hose 26 is likewise suitably T-profiled, so that the orientation of the rivets supplied can be maintained during transportation through the hose 26.

The storage unit 22 is further formed to generate a pressure gradient between the separation device 24 and the tool unit 18, so that the rivets are transported by compressed air through the rivet supply hose 26 in the direction of the tool unit 18.

Such solutions are known in principle from the prior art. Deviating from these, however, the solution according to FIG. 1 provides the coupling device 12 to connect two individual rivet supply hoses 26, 28 on the robot 14 to one another. Put more precisely, a first rivet supply hose 26 runs from the storage unit 22 and in particular the separation device 24 as far as the coupling device 12 on the robot 14. A second rivet supply hose 28 extends on the other hand from the coupling device 12 along the other robot limbs R4-R6 as far as the tool unit 18.

The rivet supply hoses 26, 28 are connected to one another via the coupling device 12 in the manner explained below so that the rivets can be transported from the storage unit 22 continuously and without substantial air pressure loss to the tool unit 18.

Individual components and functions of the coupling device 12 are explained in greater detail in the following with reference to the other figures, wherein this device is shown in some cases in different operating states, for example with a rivet supply hose 26, 28 received only on one side. The views in the various figures can also be oriented differently or be from different perspectives, which can be manifested in particular in differently shown orientations of the internal T-profiles of the rivet supply hoses 26, 28. However, it is understood that the following illustrations and explanations refer to one and the same embodiment.

Figure 2:
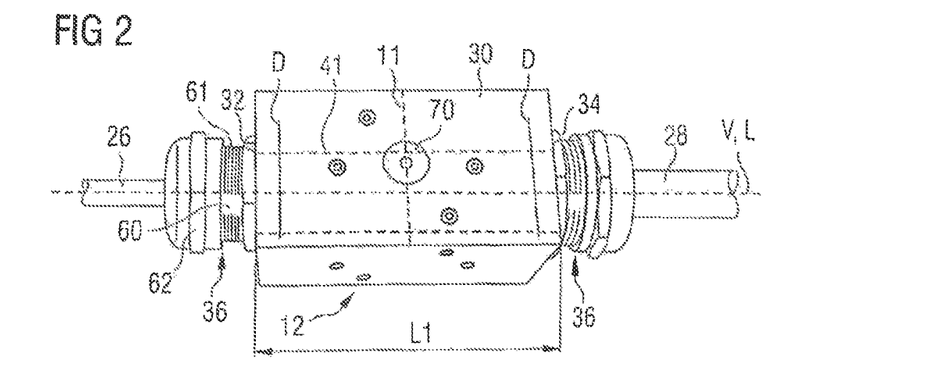
FIG. 2 a single component view of the coupling device from FIG. 1 with hollow bodies received therein.

FIG. 2 shows the coupling device 12 in a schematic single component representation. It is recognised that the coupling device 12 comprises a solid basic body 30, which is formed here as an aluminium block. The basic body 30 has on opposing side wall regions a first and second receiving opening 32, 34 respectively, which are concealed in the view in FIG. 2. The receiving openings 32, 34 each receive a clamping device in the form of a nut-thread arrangement 36, which is explained in more detail below.

It is further recognised that the receiving openings 32, 34 are arranged relative to one another so that they lie on a common connection axis V, which extends in a straight line through the basic body 30. In this case the receiving openings 32, 34 are connected to one another by a connecting channel 41 in the form of a through hole, which is likewise explained below.

Finally, the receiving of open ends of the rivet supply hoses 26, 28 in the receiving openings 32, 34 is also indicated in FIG. 2. On the left in FIG. 2 a rivet supply hose 26 is shown in the form of a so-called unsheathed rivet core, which is formed as an elongated T-profiled plastic hollow body, which transports the rivets in the direction of the tool unit 18 while maintaining the preferred orientation. On the right in FIG. 2, on the other hand, the rivet core is not recognisable but is sheathed by a flexible material to protect it against environmental influences. However, it is provided in this case also that only a similarly formed rivet core enters the receiving opening 34 and is received in an adapter piece 40 arranged there (not shown). In other words the sheathing is targetedly removed or "stripped" at the corresponding open end of the right rivet supply hose 28 and the rivet core thereby exposed in this area.

It is understood that these representations are only by way of example and the rivet supply hoses 26, 28 can generally be formed optionally as a sheathed or unsheathed rivet core or also as a simple plastic hose with a round profile. In either case it is further indicated in FIG. 2 that the longitudinal axes L of the rivet supply hoses 26, 28 likewise run along the connection axis V, so that the rivets can be transported substantially in a straight line through the coupling device 12.

Figure 3A:
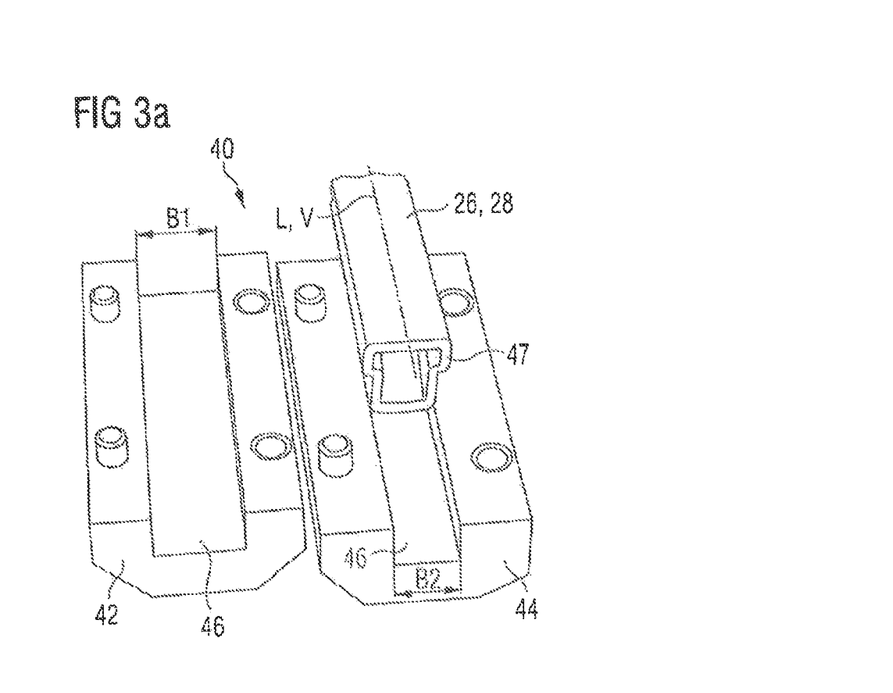
FIGS. 3a, 3b single component views of an adapter piece of the coupling device from FIG. 2 in an open state and also a state enclosing the hollow body.
Figure 3B:
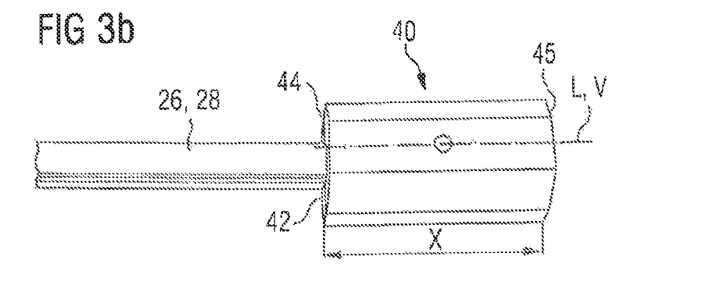

With reference to FIGS. 3a, 3b, the adapter pieces 40 received in the receiving openings 32, 34 and clamped fixedly in the connecting channel 41 are explained in more detail below. Here as an example only one adapter piece 40 is explained, which can however be inserted in principle into both receiving openings 32, 34 and in which any of the rivet supply hoses 26, 28 from FIG. 2 can be received.

A rivet supply hose 26, 28 formed as a T-profiled rivet core is first recognised in FIG. 3a. It is clear again here that the rivets can be transported with an upright T-orientation in this representation along the longitudinal or connection axis L, V through the rivet supply hose 26, 28. It is further apparent that the adapter piece 40 is formed in two parts and comprises two assemblable single components 42, 44. The single components 42, 44 are split and assemblable along a plane containing the longitudinal axis L of the rivet supply hose 26, 28. Furthermore, they each have an elongated inner section 46 in the form of a recess with a rectangular profile that is open on one side. The inner sections 46 each form a sub-area of an internal profile 48 of the adapter piece 40 and thus define a receiving area of the adapter piece for the rivet supply hoses 26, 28 (see also representation of the internal profile 48 in FIG. 4a, which is explained below).

It is further recognised that the inner section 46 of the left-hand single component 42 in FIG. 3a is formed with a greater width B1 transversely to the longitudinal or connection axis L, V than the width B2 of the right-hand single component 44. This results in the internal profile 48 of the assembled adapter piece 40 having a T-shaped internal cross-sectional profile corresponding to the associated rivet supply hose 26, 28. The adapter piece 40 in the assembled state shown in FIG. 3b can consequently enclose the rivet supply hose 26, 28 in a positive-locking manner. It further results from FIGS. 3a, b that the adapter piece 40 is formed with an octagonal external profile.

Lastly it is recognised in FIG. 3b that the adapter piece 40 has an axial length X along the longitudinal and connection axis L, V as well as a connection end face 45, with which it can be coupled in the manner described below to an opposing adapter piece 40. It is provided here that the received rivet supply hose 26, 28 is pushed far into the adapter piece 40 so that an end face of its open end 47 (cf. FIG. 3a) is aligned with the connection end face 45 of the adapter piece 40.

Figure 4A:
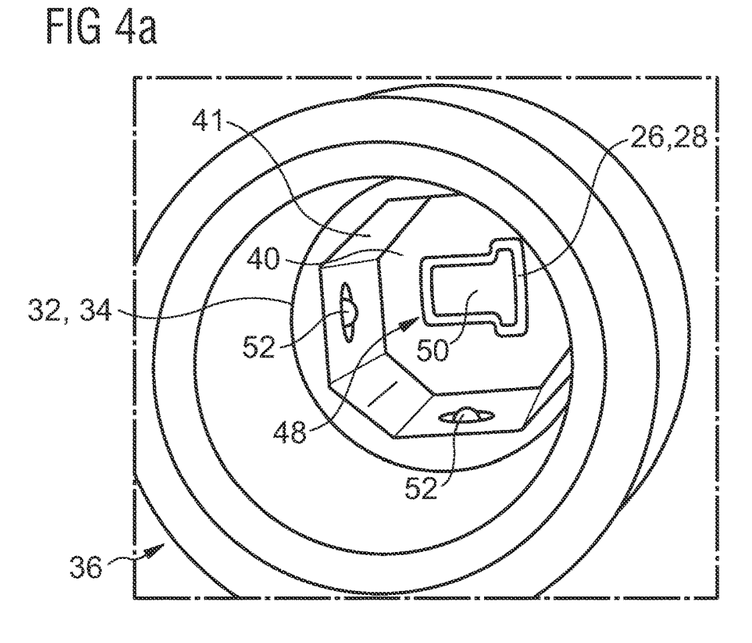
FIGS. 4a, 4b detail views of the coupling device according to the exemplary embodiment, which show the adapter piece taken up in a guide channel.
Figure 4B:
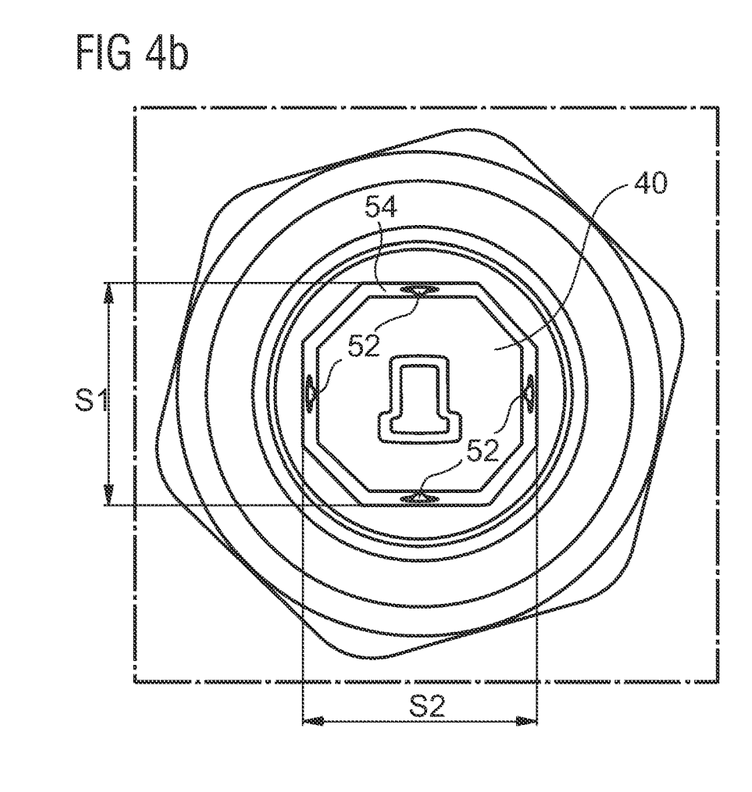

The arrangement of the adapter pieces 40 with the rivet supply hoses 26, 28 received therein in the coupling device 12 is explained below with reference to FIGS. 4a, b. FIG. 4a shows as an example a view through one of the nut-thread arrangements 36 and the associated receiving opening 32, 34 from FIG. 2 in the connecting channel 41. In the opposing receiving opening 32, 34 here an adapter piece 40 with rivet supply hose 26, 28 received therein is to be recognised, which adapter piece is pushed into the connecting channel 41. The permeability or hollow formation of the rivet supply hose 26, 28 (see cavity 50 in FIG. 4a) is recognised again as well as the internal T-profile 48 of the adapter piece 40 formed corresponding to its cross-sectional profile.

Clamping devices are further recognised in the side walls of the connecting channel 41 in the form of spring-preloaded rollers 52, which form pressure elements that can be brought into contact with the adapter pieces 40. The pressure elements 52 are positioned at respectively opposing positions in the side walls of the connecting channel 41 and at the same axial height along the connection axis V, so that they can enclose an inserted adapter piece 40 uniformly.

The corresponding positions of the pressure elements 52 are indicated schematically in FIG. 4b.

The axial position of the pressure elements 52 in the connecting channel 41 is clarified further from FIG. 2. The route of the connecting channel 41 is indicated schematically in this figure by dashed lines. It is recognised that this extends with an axial length L1 in a straight line along the connection axis V between the receiving openings 32, 34. A central cross-sectional plane M (or an axial centre M) of the connecting channel 41 is marked separately here and is located at half the axial length L1. Furthermore, two other cross-sectional planes D of the connecting channel 41 are inserted, which lie on both sides of the axial centre M, and are positioned in particular closer to the receiving openings 32, 34 than to the axial centre M. Four pressure elements 52 respectively are arranged in these cross-sectional planes D and are positioned according to the FIGS. 4a, 4b in the side walls of the connecting channel 41. Each adapter piece 40, which is introduced through one of the receiving openings 32, 34, is thus enclosed by a respective pressure element arrangement 52 in the cross-sectional planes D and brought into contact with these. Due to the roller shape and rotatable bearing of the pressure elements 52, the adapter pieces 40 can easily be pushed past these. At the same time, the spring preloading of the pressure elements 52 produces clamping forces acting radially inwards, however, so that the adapter pieces 40 are centred inside the connecting channel 41.

As shown in FIG. 4b, it is further to be noted that the connecting channel 41 has a specially shaped channel internal profile 54, in order to avoid misorientation of the adapter pieces 40. The channel internal profile 54 is formed rectangular in detail, wherein the corners are each rounded to be able to receive the polygonal external profile of the adapter pieces 40. The channel internal profile consequently has two different side lengths S1, S2, wherein the side length S1 shown in FIG. 4b slightly exceeds the side length S2. The different side lengths S1, S2 correspond to the dimensions of the external profile of the adapter piece 40 in the manner that the adapter piece 40 can be inserted into the coupling device 12 only with predetermined orientations. Put more precisely, an introduction is only possible with either the orientation indicated in FIG. 4b (internal T-profile 48 standing on its head) or with an orientation rotated by 180° about the connection axis V (upright internal T-profile 48, cf. FIG. 3a). It is understood that this applies to both adapter pieces 40, 40, which are introduced through the respective receiving openings 32, 34, so that misorientation relative to one another can be avoided. It is further understood that the channel internal profile 54 can also be formed in principle so that only one orientation of the adapter pieces 40 is possible upon take-up in the connecting channel 41.

With reference to the figures discussed above, the mode of operation of the coupling device 12 is explained below. In an initial setup of the assembly system 10 or servicing taking place in the interim, suitable rivet supply hoses 26, 28 for the rivets to be transported currently are first selected. Depending on the cross-sectional profile of these rivet supply hoses 26, 28, an adapter piece 40 is then selected. To this end suitable single components 42, 44 are assembled with which a profiled internal profile 48 matching this cross-sectional profile can be formed for the adapter piece 40. The adapter pieces 40 with rivet supply hoses 26, 28 arranged therein are then introduced through one of the receiving openings 32, 34 respectively into the coupling device 12 and moved towards one another along the connection axis V. Here they are centred by action of the pressure elements 52 in the respective cross-sectional planes D. In the region of the axial centre M of the connecting channel 41, the adapter pieces 40 then meet with their connecting end faces 45, due to which the corresponding end faces of the rivet supply hoses 26, 28 are also brought into contact with one another. The length X of the adapter pieces 40 is chosen here so that these extend starting out from the axial centre M of the connecting channel 41 up to close to the receiving openings 32, 34 through the cross-sectional planes D and are clamped there by the pressure elements 52. Due to the positive-locking enclosure of the rivet supply hoses 26, 28 by the adapter pieces 40 and the enclosure of these adapter pieces 40 by the connecting channel 41, the rivets can pass over from the storage unit 22 in FIG. 1 without substantial pressure loss or other complications from the first to the second rivet supply hose 26, 28 and be transported to the tool unit 18.

If it is now required in the context of a change in assembly task to transport other rivets, which necessitate other rivet supply hoses 26, 28, it is sufficient to select afresh and/or adapt only the adapter pieces 40, so that these can receive the differently profiled rivet supply hoses 26, 28. The coupling device 12, on the other hand, does not need to be adapted separately and can remain on the robot 14 without further modifications. If wear also occurs, it is usually sufficient to exchange only the shorter second rivet supply hose 28 between the coupling device 12 and the tool unit 18, while the longer first rivet supply hose 26 can be used over a longer period.

The above mode of operation and in particular the clamping and low-pressure-loss connection of the rivet supply hoses 26, 28 are further improved by the nut-thread arrangements 36 in the receiving openings 32, 34. From an overview of FIGS. 2 and 5 it is recognised that the nut-thread arrangements 36 each have an annular basic body 60, on the outer circumferential surface of which a thread 61 is formed. Arranged on the thread 61 is a nut 62, which is movable back and forth in consequence of a screwing movement along the connection axis V. Both the basic body 60 and the nut 62 have stop surfaces 64 axially opposing one another here on their inner circumferential surfaces, as is indicated schematically for the nut 60 in FIG. 5. When the nut 62 is screwed onto the thread 61, the axial distance between these stop surfaces 64 is thus reduced. A clamping element 66 is axially compressed by this and pressed radially inwards, so that the respective receiving opening 32, 34 constricts. The rivet supply hose 26, 28 received therein can be additionally clamped by this and fluidically sealed relative to the environment.

Figure 5:
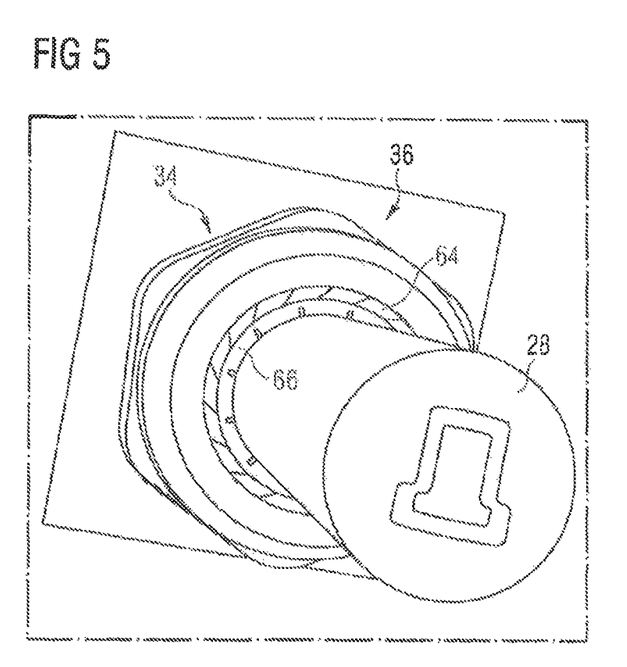
FIG. 5 a detailed view of the coupling device according to the exemplary embodiment, which shows a clamping device in the form of a nut-thread arrangement.

It is noted that in FIG. 5 the right receiving opening 34 from FIG. 2 is shown, which receives the sheathed rivet supply hose 28 and clamps and seals it by means of the nut-thread arrangement 36. As explained above, the sheathing of the rivet supply hose 28 is removed at its end, so that the rivet core contained therein and formed by analogy with FIGS. 3a, b is receivable directly in an adapter piece 40. On the other hand, the left-hand nut-thread arrangement 36 shown in FIG. 2 shows that even an unsheathed rivet supply hose 28 in the form of a pure rivet core can be received and clamped directly in a nut-thread arrangement 36. A variant is also conceivable in which at least one of the adapter pieces 40 extends from the axial centre M of the connecting channel 41 with a greater length X beyond the associated receiving opening 32, 34 and can thus likewise be received and clamped directly by a corresponding nut-thread arrangement 36.

Figure 6:
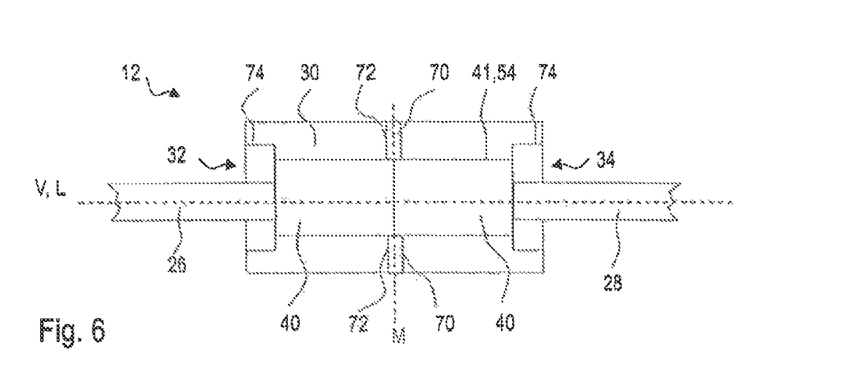
FIG. 6 a sectional view of the coupling device from FIG. 2 to explain a sensor unit arranged therein.

In conclusion let reference be made further to a sensor unit 70, which is insertable according to FIGS. 2 and 6 into a threaded through hole 72 into the basic body 30 and is positioned close to the axial centre M. The sensor unit 70 is formed to detecting passing of the rivets through the adapter pieces 40 and the rivet cores 26, 28 received therein, which are shown unsheathed in FIG. 6, in the region of the axial centre M. It can generate corresponding sensor signals, in order to provide an operator (at least indirectly) with feedback on a successful coupling and the permeability of the rivet supply hoses 26, 28. The sensor unit 70 generally detects the passage of a metal rivet through the adapter pieces 40 manufactured from plastic and the rivet supply hoses 26, 28 capacitively or inductively and generates a corresponding signal pulse. If a rivet gets stuck in the detection area of the sensor unit 70, the ongoing presence of this component is indicated by a corresponding constant signal, whereupon a control unit of the assembly system, which is not shown, can emit warning signals or adapt the air pressure in the rivet supply hoses 26, 28. The same applies to the case that a sensor signal does not materialise at a predetermined point in time and is generated too late or too early, which is critical for adherence to preset assembly cycle times (see also following explanation).

FIG. 6 shows two sensor units 70 as an example, which are inserted into a respective threaded through-hole 72. However, it is also provided only to use one sensor unit 70. For the sake of completeness let it also be mentioned that an expanded receiving area 74 of the receiving openings 32, 34 is also recognised in FIG. 6, in which area the nut-thread arrangements 36, not shown in this representation, can be received. The channel internal profile 54 connects thereto, in order to avoid the misorientation of the adapter pieces 40 explained above.

Figure 7:
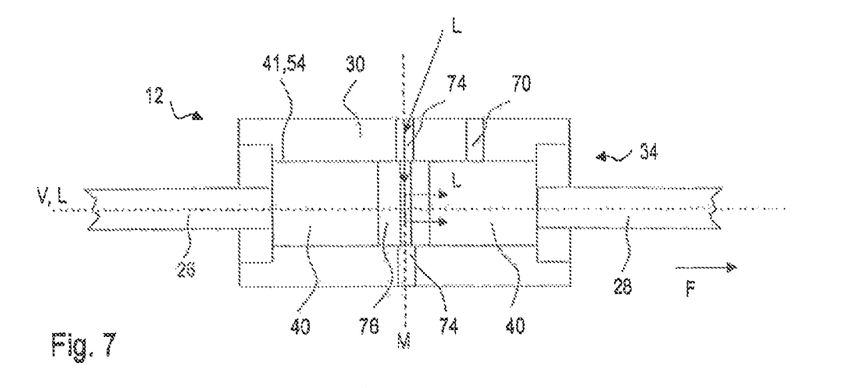
FIG. 7 a sectional view of a coupling device according to another exemplary embodiment.

Another embodiment of the coupling device 12 is explained with reference to FIGS. 7 and 8, which facilitates an additional compressed air supply into the rivet supply hoses 26, 28. Here FIG. 7 shows a sectional view, in which the section plane contains the connection axis V. The basic body 30 formed similarly to FIG. 6 is recognised again with the elongated connecting channel 41, which receives two adapter pieces 40 with rivet supply hoses 26, 28 arranged therein. A sensor unit 70 formed similarly to FIG. 6 is also recognised, but which is arranged in this case between the axial centre M and the second rivet supply hose 28 (thus between the axial centre M and the receiving opening 34 on the outlet side viewed in the conveying direction F or between the coupling area of the adapter pieces 40 and the corresponding receiving opening 34). The sensor unit 70 can thus continue to detect whether rivets to be conveyed are transported reliably through the coupling device 12 and in particular pass over from one rivet supply hose 26, 28 to the other without malfunction.

In the region of the axial centre M, connecting channels 74 formed by cross holes are provided instead, wherein even a single such connecting channel 74 is sufficient in principle. These channels 74 are connected to a compressed air supply device of the assembly system 10, which device is not shown, and form connection areas of the coupling device 12, in order to feed compressed air continuously or temporarily into the rivet supply hoses 26, 28. The coupling device 12 comprises for this purpose an adapter intermediate piece 76, which is arranged between the adapter pieces 40 when viewed along the connection axis V and is in contact with each of these. The adapter intermediate piece 76 comprises a channel-like cavity (not shown), which is shaped similar to the internal T-profile of the rivet supply hoses 26, 28 and is formed as a through-hole along the connection axis V. The adapter intermediate piece 76 further has a similar external profile to the adapter pieces 40 and is thus likewise arranged with a predetermined orientation inside the connecting channel 41.

As a result, the cavity of the adapter intermediate piece 76 aligns with the internal profiles of the rivet supply hoses 26, 28, so that a rivet can be transported continuously along the connection axis V and can pass from the first rivet supply hose 26 into the cavity of the adapter intermediate piece 76 and from there into the second rivet supply hose 28.

Figure 8:
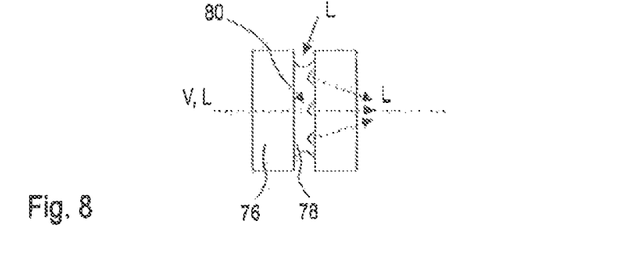
FIG. 8 a single component view of an adapter intermediate piece of the coupling device from FIG. 7.

As highlighted separately in FIG. 8, the adapter intermediate piece 76 further comprises an annular groove 78, which runs around an outer circumferential surface and the connection axis V. Starting out from the annular groove 78, several holes 80 extend into the profiled cavity of the adapter intermediate piece 76. A single such hole 80 is sufficient for this in principle. However, as an example four holes 80 are provided, which are distributed evenly along the annular groove 78. As indicated by arrows L2 in FIGS. 7 and 8, compressed air can thus pass via the channels 74 and the holes 80 into the cavity of the adapter piece 76 and via this also into the internal profiles of the rivet supply hoses 26, 28 that are aligned with it. In particular, compressed air can be fed into the second rivet supply hose 28 leading to the tool unit 18, in order to accelerate the rivet transport.

The assembly system 10 or a control unit thereof, which is not shown, can generally be formed to activate and/or adapt the supply of compressed air via the connecting channels 74 or according to certain operating states of the assembly system 10. For example, the supply of compressed air can be activated selectively if an unreasonably low air pressure level is detected along the transport path of the rivets.

It can likewise be generally provided to control the compressed air supply according to sensor signals of the sensor unit 70. For example, in the event of the constant signal described above as a result of the jamming of a rivet inside the coupling device 12, the compressed air supply can be increased temporarily. The same applies if the passage of a rivet is detected unexpectedly late by the sensor unit 70 and the rivet transport is to be accelerated. On the other hand, the compressed air supply can be reduced or interrupted if the passage of a rivet is detected unexpectedly early. The adaptation of the compressed air supply can take place here in particular according to a preset cycle time and/or rivet conveying time of the assembly system 10. In addition or alternatively, a substantially continuous compressed air supply can take place, for example according to a total length of the conveying path of the rivets through the rivet supply hoses 26, 28 and the coupling device 12. A pressure drop caused by route or length can be preventively avoided by this.

A similar compressed air supply can take place alternatively even without the adapter intermediate piece 76, wherein corresponding annular grooves and/or holes can be provided directly in at least one of the adapter pieces 40. In this case the holes can extend through the A similar compressed air supply can take place alternatively even without the adapter intermediate piece 76, wherein corresponding annular grooves and/or holes can be provided directly in at least one of the adapter pieces 40. In this case the holes can extend through the adapter pieces 40 into the internal profiles of the rivet supply hoses 26, 28 or of the rivet cores there and facilitate a continuous or temporary compressed air supply in the same manner.

Although the invention has been described with a certain degree of particularity, those skilled in the art can make various changes to it without departing from the spirit or scope of the invention as hereinafter claimed.

The invention claimed is:

1. Coupling device that connects connecting element supply hoses in an assembly system, comprising:
a basic body in which a first receiving opening receives a first supply hose and a second receiving opening receives a second supply hose is formed, wherein the receiving openings are connected to one another via at least one connecting channel in the basic body and the receiving openings are arranged relative to one another in such a way that the first and second supply hoses can be coupled to one another after introduction into the respective receiving openings, and wherein each of the receiving openings comprises an exchangeable adapter piece, the adapter piece being non-cylindrical and having an elongated recess with a rectangular profile for receiving a supply hose, wherein the at least one connecting channel comprises a specially shaped internal profile in order to avoid misorientation of the adapter pieces;
at least one clamping device, which is formed to clamp at least one of the supply hoses and/or the adapter piece fixedly in the coupling device, wherein the clamping device is arranged in the connecting channel of the basic body;
and, a pressure element, which can be brought into contact with at least one of the supply hoses and/or the adapter piece with the production of clamping forces.

2. Coupling device according to claim 1, wherein the connecting channel is formed with a closed cross-sectional profile.

3. Coupling device according to claim 1, wherein the coupling device is formed to connect the supply hoses to one another with substantially fluidic decoupling from the environment.

4. Coupling device according to claim 1, wherein the coupling device is formed in such a way that the adapter piece can only be arranged therein with predetermined orientations, as by a corresponding profile of at least one of the receiving openings.

5. Coupling device according to claim 1, wherein the supply hoses further comprise a predetermined cross-sectional profile and each adapter piece comprises a correspondingly profiled receiving area for receiving one of the supply hoses.

6. Coupling device according to claim 1, further comprising a connection area for the supply of a compressed air connection, wherein the connection area is connectable in a fluid-conducting manner to at least one of the supply hoses.

7. Coupling device according to claim 6, further comprising an adapter intermediate piece, which can be arranged in the coupling device in such a way that at least one of the supply hoses is connectable in a fluid-conducting manner via the adapter intermediate piece to the connection area.

8. Assembly, comprising a coupling device according to claim 1, and at least one additional exchangeable adapter piece, wherein the adapter pieces are formed to receive hollow bodies with cross-sectional dimensions different from one another.

9. Assembly system, comprising at least one coupling device according to claim 1, wherein the supply hoses are for connecting elements for a tool unit.

10. Assembly system according to claim 9, wherein the connecting elements are rivets and wherein the assembly system is formed to undertake the supply of the assembly elements to the tool unit with a compressed air impact on the supply hoses.

11. Assembly system according to claim 9, comprising an industrial robot with a plurality of moving robot limbs, wherein the coupling device is arranged on one of the robot limbs and, wherein the robot limbs form a kinematic chain, at the end of which a connection area is arranged for the tool unit, and the coupling device is mounted on a robot limb, which is spaced by a maximum of four robot limbs from the connection area.

* * * * *